United States Patent [19]

Weissmann et al.

[11] Patent Number: 5,333,130
[45] Date of Patent: Jul. 26, 1994

[54] SELF-HEALING DROP AND INSERT COMMUNICATION NETWORK

[75] Inventors: Emanuel Weissmann, Richmond Hill; Ian M. Alexander, Pickering, both of Canada

[73] Assignee: Alcatel Canada Wire, Inc., North York, Canada

[21] Appl. No.: 62,899

[22] Filed: May 18, 1993

[51] Int. Cl.⁵ .............................................. H04J 3/14
[52] U.S. Cl. ................................ 370/16; 340/825.03; 371/11.2
[58] Field of Search ................. 370/13, 16, 85.1, 85.5, 370/85.9, 85.12, 85.15, 85.13, 16, 15, 16.1; 340/827, 825.01, 825.03, 826; 371/8.2, 11.1, 11.2, 8.1

[56] References Cited

U.S. PATENT DOCUMENTS

| | | | |
|---|---|---|---|
| 4,509,117 | 4/1985 | Korowitz | 364/200 |
| 4,530,085 | 7/1985 | Hamada et al. | 370/16 |
| 4,593,154 | 6/1986 | Takeda et al. | 370/16 |
| 4,815,069 | 3/1989 | Nakayashiki et al. | 370/16 |
| 5,146,452 | 9/1992 | Pekarske | 370/16 |
| 5,159,595 | 10/1992 | Flanagan et al. | 370/16 |

FOREIGN PATENT DOCUMENTS 0148297  7/1985  European Pat. Off.

OTHER PUBLICATIONS

"A Class of Self-Healing Ring Architectures for SONET Network Applications", T. Wu et al, *IEEE Transactions on Communications*, vol. 40, No. 11, Nov. 1992, pp. 1746-1756.

Primary Examiner—Douglas W. Olms
Assistant Examiner—Huy D. Vu
Attorney, Agent, or Firm—Ware, Fressola, Van Der Sluys & Adolphson

[57] ABSTRACT

A self-healing drop/insert (D/I) communication method and network are provided. The network comprises two end stations and a chain of intermediate D/I multiplexer stations to which the two end stations are connected by two lines, so as to provide communication in both directions, East and West, for multiple data and/or voice channels between any of the stations. According to the invention, the end stations are collocated or located near one another and in the event of a break or failure in the network, they are interconnected to form one D/I multiplexer station, whereas the stations on each side of the break or failure become new end stations. The communication transmitted by the multiple data and/or voice channels is then redirected away from the point of break or failure, when it occurs, thereby allowing the network to self-heal and remain operational after the break or failure.

7 Claims, 12 Drawing Sheets

SELF-HEALING DROP AND INSERT COMMUNICATION NETWORK

TECHNICAL FIELD

This invention relates to an improved drop and insert (D/I) communication network. More particularly, it relates to making a D/I multiplexer network self-healing in case of break or failure, thereby achieving failure protection in such network.

BACKGROUND OF THE INVENTION

It is well known that present D/I communication networks comprise two end stations connected by two lines to a chain of intermediate D/I multiplexer stations. They provide communication for multiple data and/or voice channels between any two or more stations. The channel access can be in either direction, i.e. it can be directed East or West.

The problem with such networks is that when there is a break or failure within the network it must be found and repaired before the network can resume its normal operation. This may be time-consuming and while the search for the failure and subsequent repairs are carried out, the network is out of service, which is a major problem.

Some attempts have been made to provide protection to such communication networks by using protection switching, i.e. routing the traffic from a faulty channel onto a protection channel. One such system is described in Canadian Patent 1,255,770 issued Jun. 13, 1989 in which there is provided an individually controlled selector for each normal channel for selectively supplying the traffic of the channel to the protection channel. Such a system requires duplication of all channels, since for every normal channel there must be a protection channel and in case of fault the faulty normal channel is switched to redirect traffic to the protection channel. This is tedious and costly.

DISCLOSURE OF INVENTION

An object of the present invention is to obviate the above mentioned disadvantages and to provide a self-healing D/I communication network that will mainly use the existing hardware and only add some new "smart" features to implement the protection mechanism.

Another object of the invention is to provide a self-healing method that does not require any switching of the aggregate communication, thereby avoiding the disruptions associated with such switching.

A still further object of the invention is to provide a self-healing system which, besides protecting point to point connections, easily preserves party line and multi-drop connection.

A still further object of the invention is to provide a self-healing method and system which are more flexible and less disruptive in case of protection activation and recovery from protection than previously known methods and systems of this kind.

In order to achieve the above objects, the present invention teaches that the two end stations of the D/I communication network are collocated or located near one another and in the event of a break or failure in the network, said two end stations are interconnected to form one D/I multiplexer station, whereas the stations on each side of the break or failure become new end stations, and means are provided for redirecting communication transmitted by the multiple data and/or voice channels away from the point of break or failure when it occurs, thereby allowing the network to self-heal and remain operative after occurrence of such break or failure. More particularly, said means provide for redirecting individual channels in case of break or failure.

The means for redirecting communication transmitted by the channels away from the point of break or failure comprise channel access circuits which can be oriented East or West by electrical control and which are configured to automatically change direction in case of break or failure in the network. This change of direction is done using "smart" channel cards and the direction of connection of each card, whether East or West, is software controlled.

A self healing method for a drop/insert (D/I) communication network is also provided in accordance with the present invention, which comprises interconnecting the end stations of the D/I network so as to form one D/I multiplexer station and redirecting communication away from the break or failure, when it occurs, thereby allowing the network to self-heal and remain operational after the occurrence of the break or failure. In this method the redirecting of communication is achieved by a change of configuration controlled by a failure signal sent from the stations adjacent to the point of failure towards the end stations and received also by all other stations. This failure signal is used to individually redirect the channels or to redirect all channel connections away from the break or failure and is software controlled.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
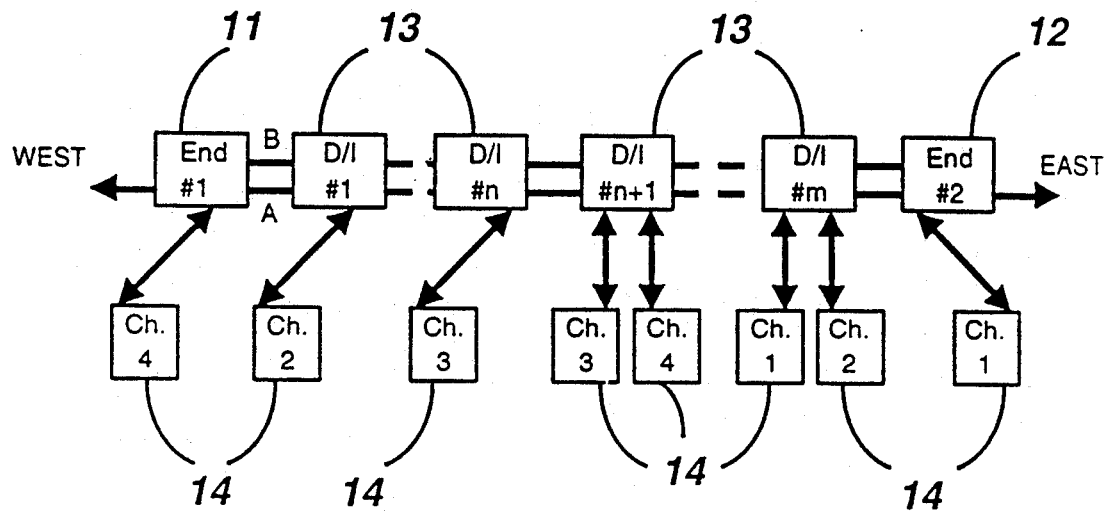
FIG. 1 is a diagram of the known drop and insert (D/I) communication network, designated as "PRIOR ART"

Referring now to FIG. 1, it shows a known structure of a drop and insert (D/I) multiplexer network comprising two end stations 11, 12 connected by two lines A, B to a chain of intermediate D/I multiplexer stations 13. It provides communication for multiple data and/or voice channels 14, designated as channels Ch. 1, Ch. 2, Ch. 3 and Ch. 4, between any two or more stations. The channel access can be directed East or West.

Figure 2:
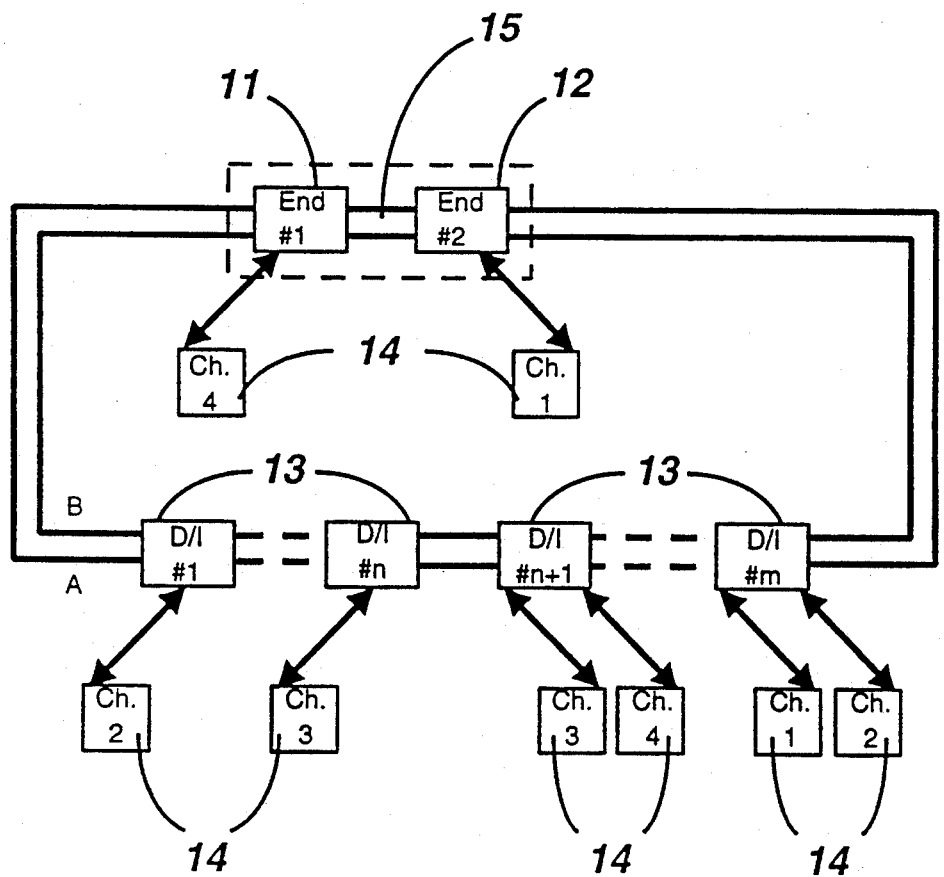
FIG. 2 is a diagram of the D/I network arranged in accordance with the present invention.

The basic principle of the arrangement of the D/I network in accordance with the present invention is shown in FIG. 2 where the end stations 11, 12 are collocated and a new path of communication 15 is created between them. The rest of the network remains essentially unchanged from the known network of FIG. 1.

Figure 3:
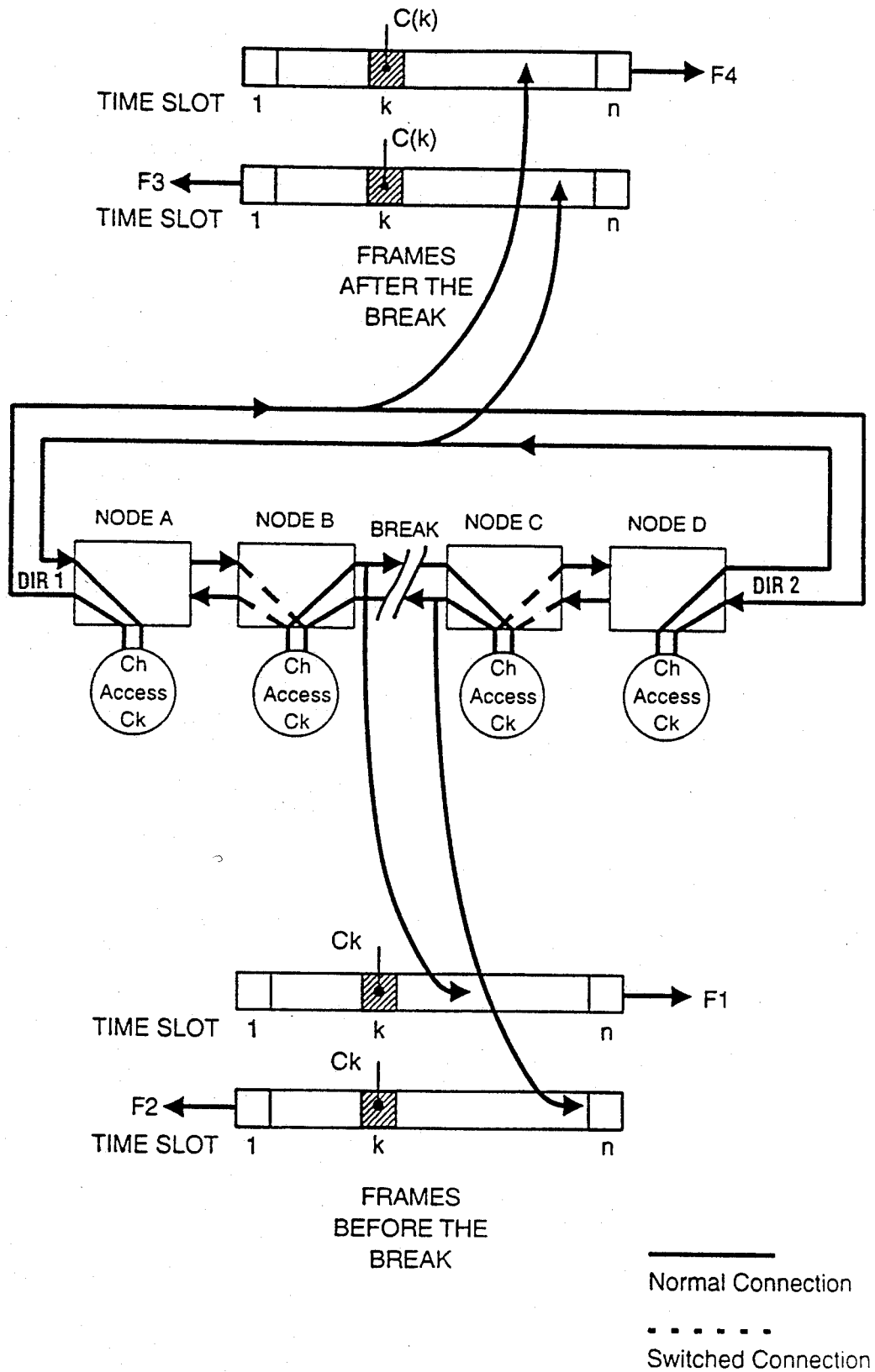
FIG. 3 is a diagram of the D/I network in accordance with the present invention with a break in the network.

The present invention applies to the transmission of digital information using time-division multiplexing (TDM). For example, the information channels 1 to n may have allocated timeslots numbered from 1 to n, respectively, that are inside a time frame (F); n is the maximum number of channels available in the system. As shown in FIG. 3, a connection between two nodes, B and C, uses slot k in frames F1 and F2 of a duplex connection. After the break, the connection between the two nodes uses the same slot number (k), but in frames F4 and F3, respectively, sent away from the failure. As shown, the normal connection between Nodes B and C that is shown with solid lines is replaced after the break by a switched connection shown in dashed lines.

If the protection (healing) switching mechanism is disabled, a connection between A and D in FIG. 3 can use slot k in frames F3 and F4, while the connection between B and C uses slot k in frames F1 and F2. This increases the total transmission capacity of the system, but no protection is then available for either the A-to-D or the B-to-C connections.

The system planner can choose a proper combination of protected and not protected channels to optimize the use of the available transmission capacity.

Figure 4:
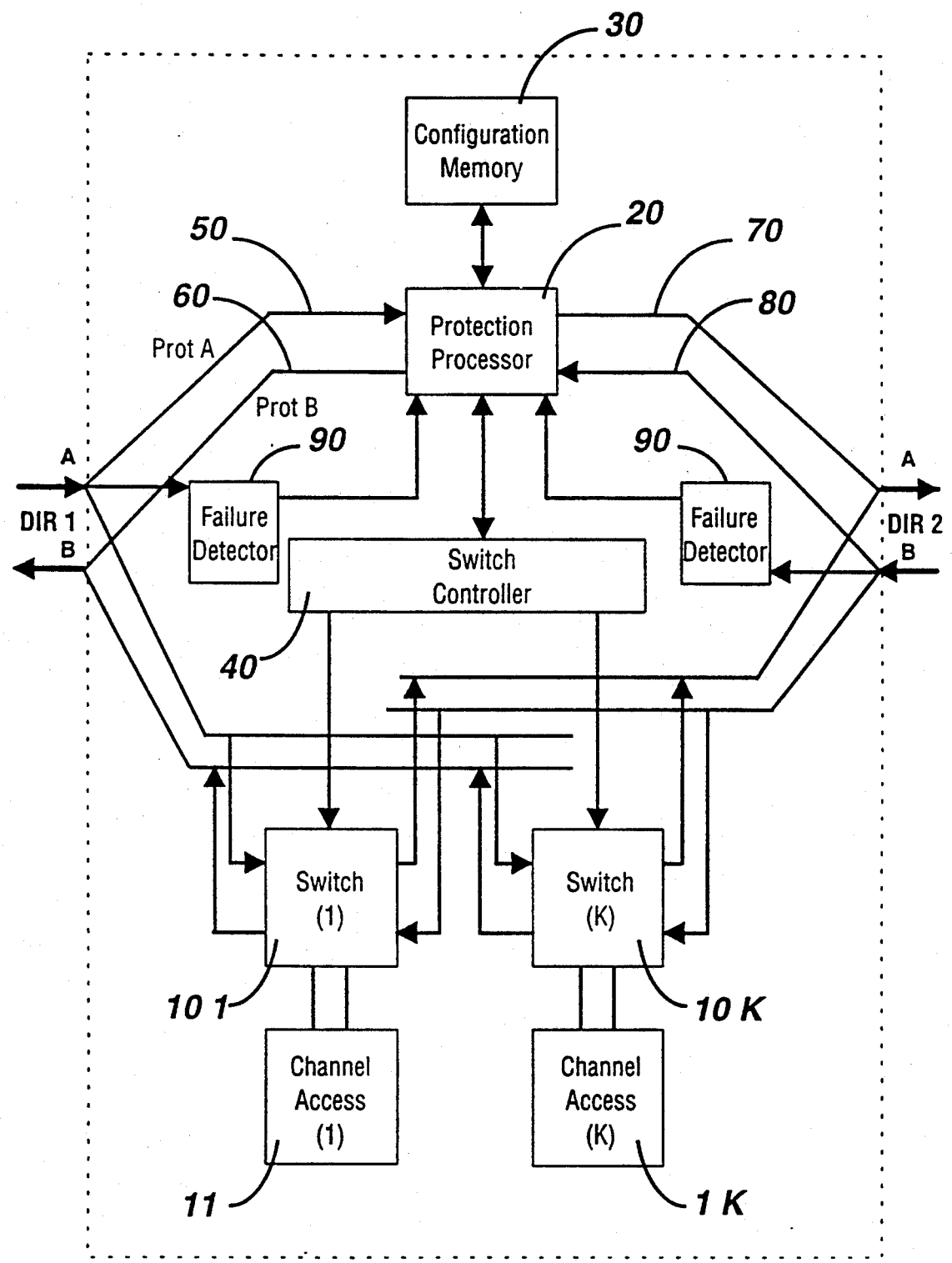
FIG. 4 is a simplified node protection diagram in accordance with the present invention.

Configuration change control for self-healing is shown in FIG. 4, wherein automatic healing of a failed communication system uses a configuration control device and a method for using it, which are described below.

The configuration control device shown in FIG. 4 is included in an existing D/I structure 13 modified as described above.

1. All of a plurality of channel access ports (1 1 to 1 k) at a node have switches (10 1 to 10 k) which, under software control, can connect the associated channels 14 to one of two directions of communication (DIR 1 or DIR 2, which may be called west and east, respectively).

2. Protection channels A and B (50 and 60, 70 and 80) are data message channels which carry from node to node information about the channel's configuration.

3. The received protection messages (PROT A on channel 50 and PROT B on channel 80), together with the node's configuration stored in a non-volatile memory 30 are processed by a protection processor 20 to issue the PROT messages sent on the protection channels 70 and 60.

4. Aggregate failure detectors 90 for each direction (DIR 1 and DIR 2) are connected to the protection processor 20.

Figure 5:
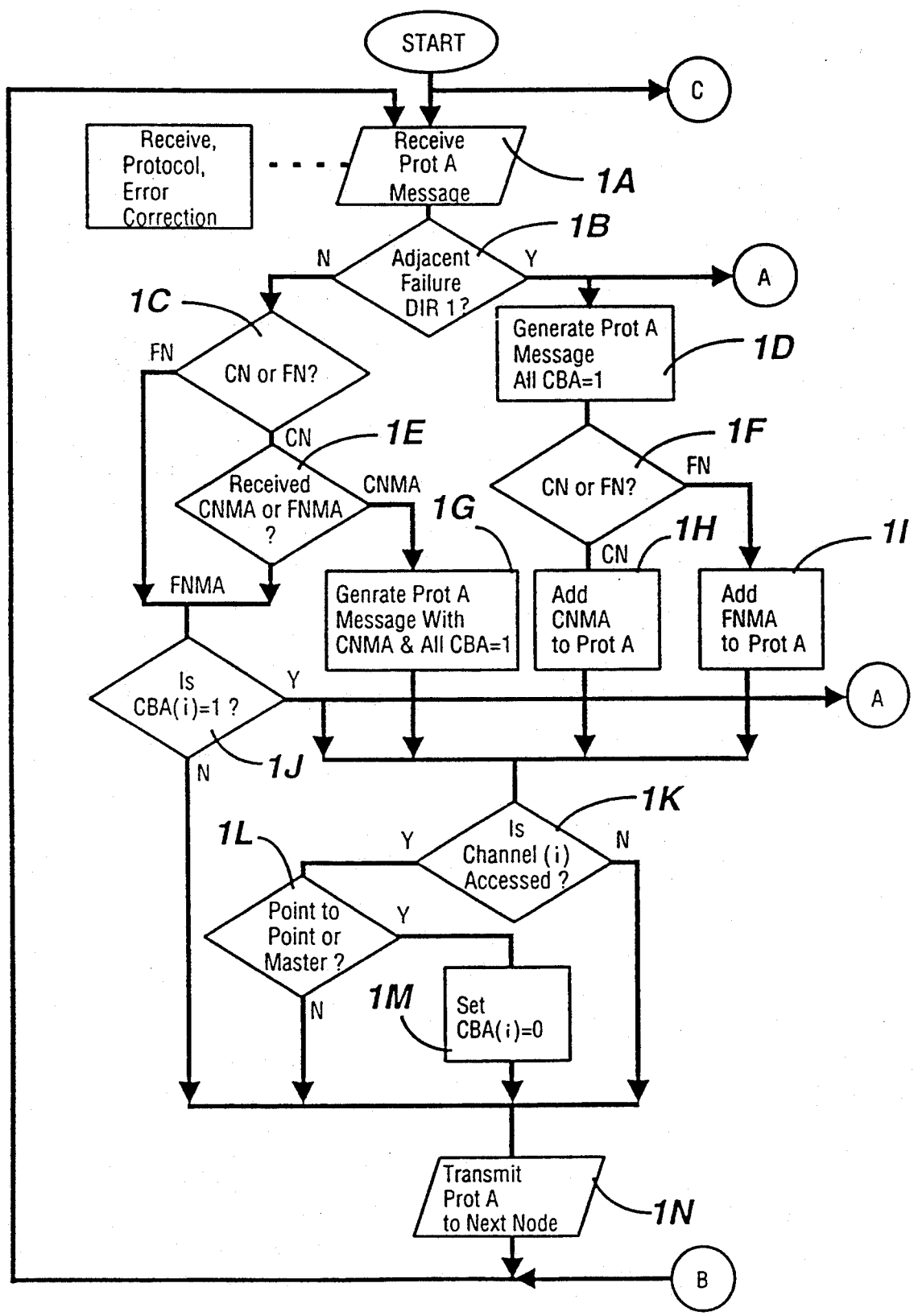
FIGS. 5-8 are flowcharts illustrating the protection method carried out by the hardware shown in FIG. 9, according to the present invention.
Figure 6:
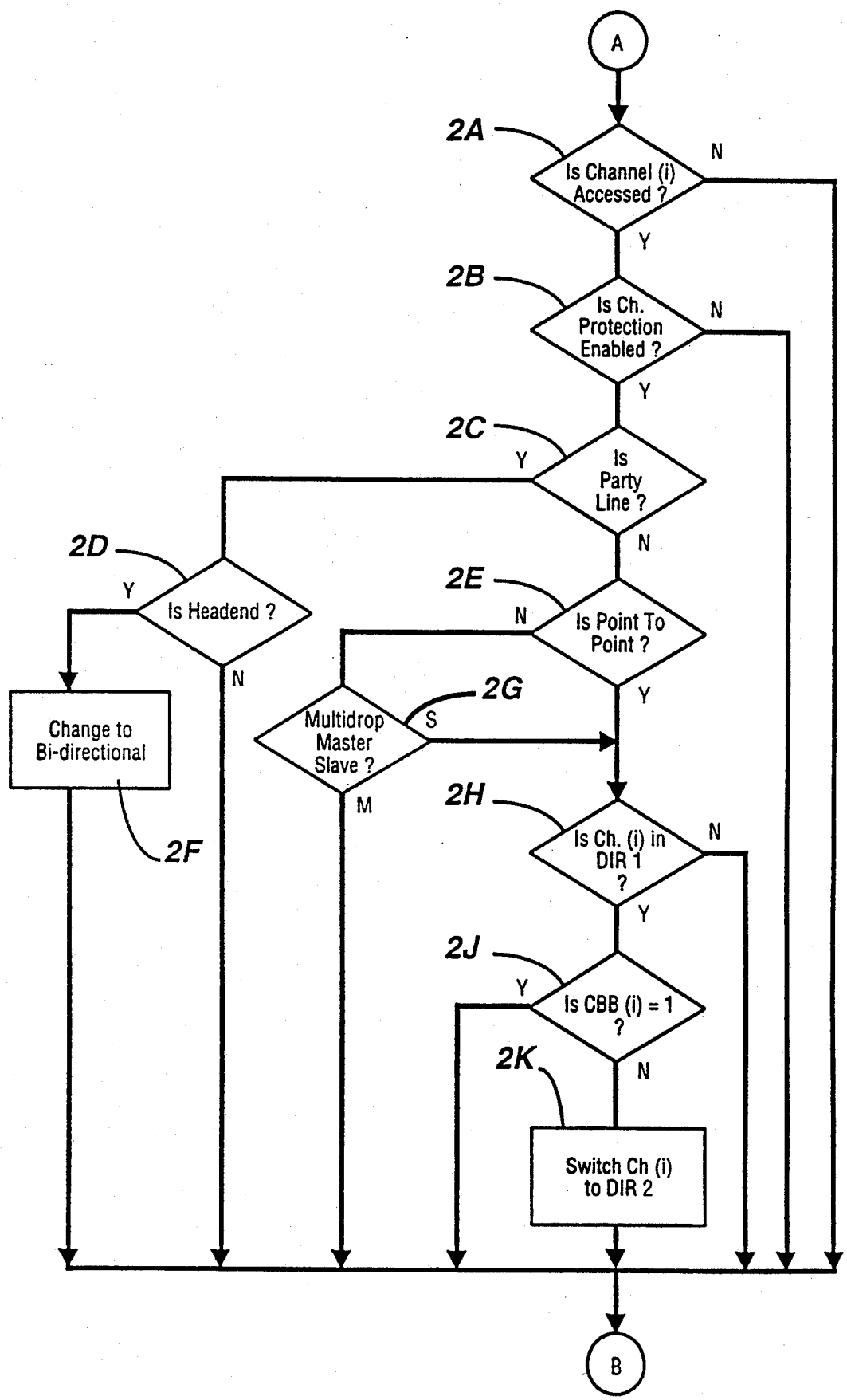

The protection method carried out by the hardware shown in FIG. 4 is shown in the flowcharts illustrated in FIGS. 5–8. FIGS. 5 and 6 check for reception of PROT A messages and FIGS. 7 and 8 for reception of PROT B messages. In general, protection message processing involves circulating protection messages in protection channels in parallel with the communication channels, on lines A and B. They carry one bit of information about the status of every channel available: channel bits CBA(i), where (i) = 1 to n (where n = total number of channels), on line A and channel bits CBB(i), where (i) = 1 to n, on line B.

Figure 9:
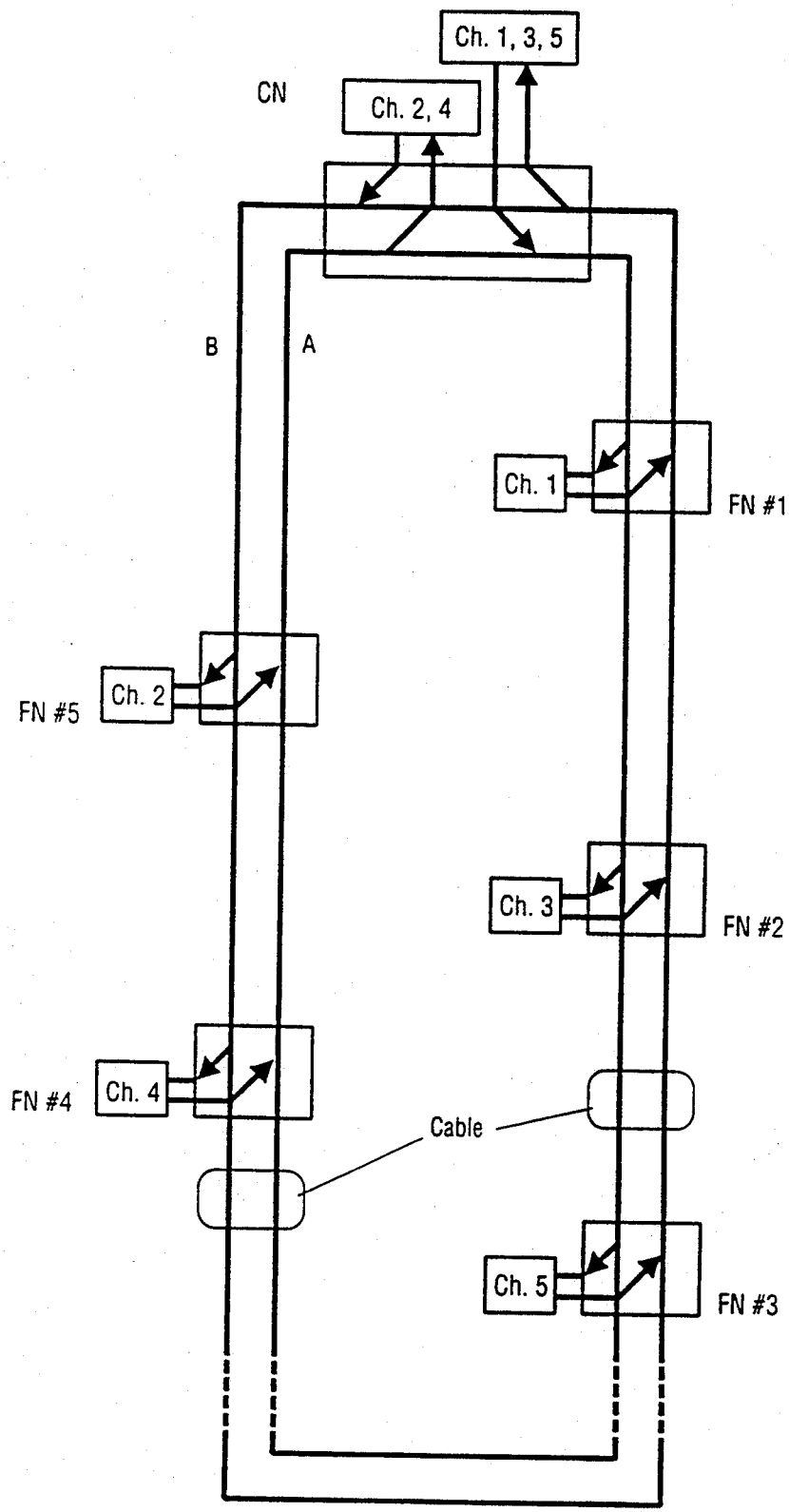
FIG. 9 is a diagram showing the configuration of a system implementation in accordance with the present invention.

FIG. 9 illustrates an example of configuration in accordance with the present invention. In this example, the end multiplexer channel banks are merged into one location, named the Central Node (CN). All the other D/I stations or nodes are named Field Nodes (FN).

Figure 7:
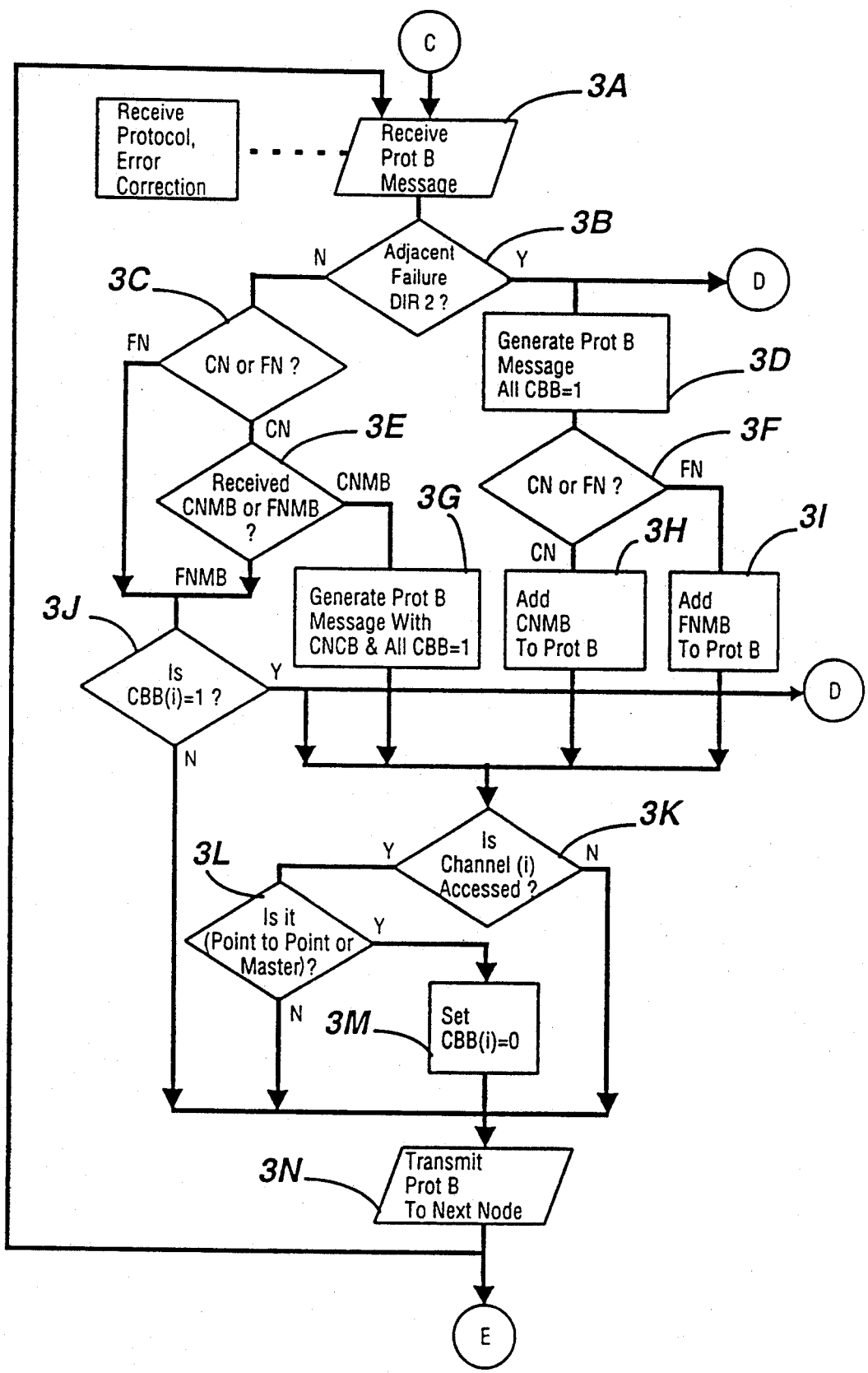

In the normal situation (no failure in the system), protection messages are sent from the Central Node on each line (see step 1G and 3G in the flowcharts of FIGS. 5 and 7, respectively). CBA = "0" and CBB = "0" are sent for every channel accessed at the central node (see steps 1L and 3L in FIGS. 5 and 7, respectively). CBA = "1" and CBB = "1" are sent for every other possible channel.

In addition, each protection message includes Central Node Marks (CNMA and CNMB, and flowchart steps 1H and 3H in FIGS. 5 and 7, respectively), which signal to other nodes that the messages originate at the central node and that the connection to the CN is unbroken.

The two messages are processed by the protection processor 20 of FIG. 4 at every FN and the results transmitted to the following nodes. The CBs are changed from "1" to "0" for the channels accessed at that node (see flowchart steps 1C, 1J, 1L and 3C, 3J, 3L in FIGS. 5 and 7, respectively). A CB which is already "0" is not changed.

Having described protection message processing, channel switching will now be described. In case of aggregate failure (for example, as determined in a step 1B and 3B in FIGS. 5 and 7, respectively, representing a fiber break or the like) the direction switching for point-to-point channels operates as follows:

1. An FN detecting the failure receives neither a CNM, nor a protection message from the CN. As a result, it generates a protection message in the same way as the CN does, but instead of the CNM, a Field Node Mark (FNM) is attached (as indicated in steps 1D, 1F, 1I in FIG. 5 and 3D, 3F, 3I in FIG. 7). Simultaneously, the node's Channel Access ports switch to the direction opposite the failure (2A, 2B, 2C, 2D, 2E of FIG. 6 and 4A, 4B, 4C, 4D, 4E of FIG. 8). It should be noted that if a node receives both CNMs, no switching takes place.

Figure 8:
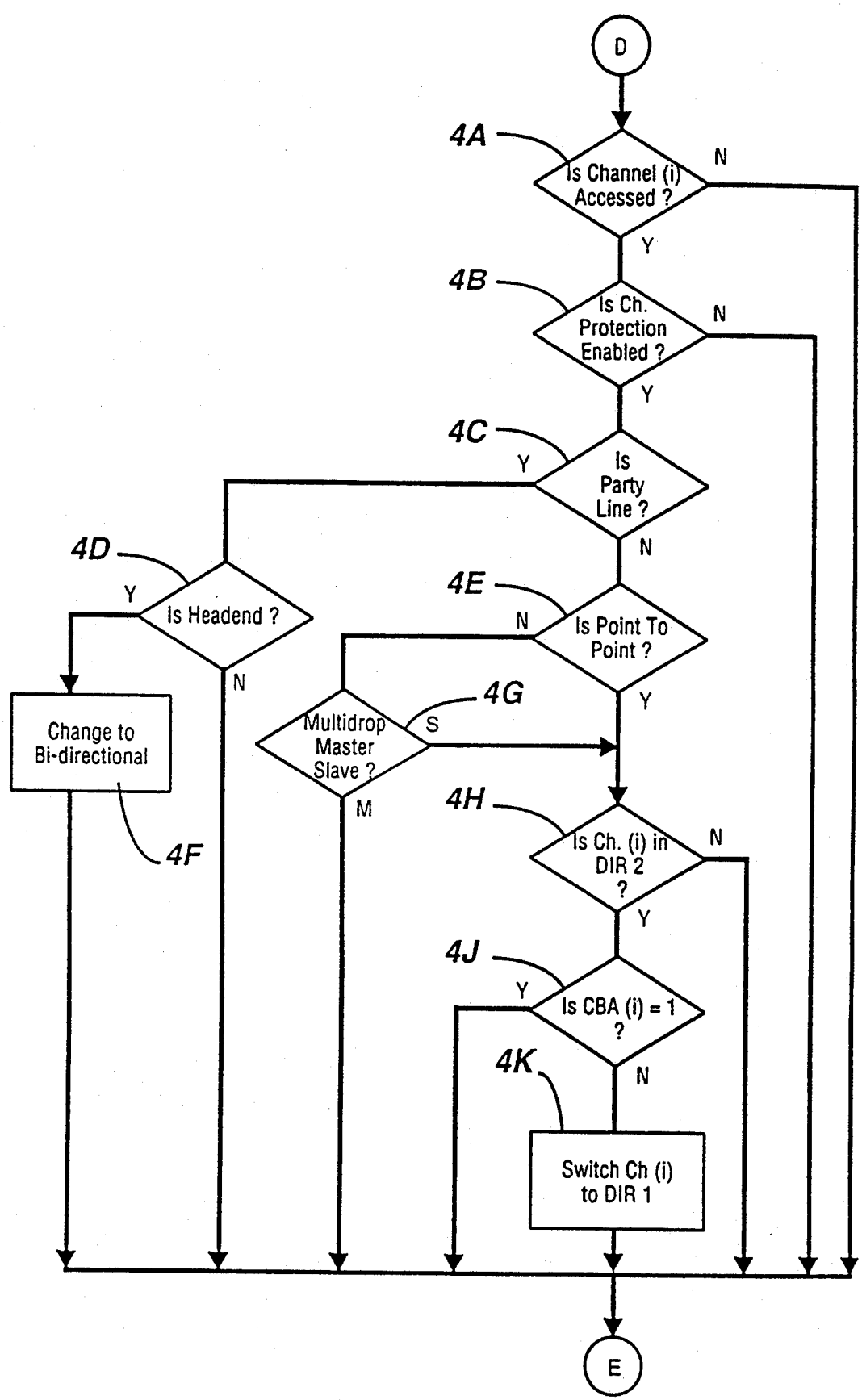

2. When any node detects a protection message with FNM (steps 1E, 3E of FIGS. 5, 7 respectively), it decides that there is an aggregate failure upstream. The reception of a CB(i) = "1" at a node that accesses channel (i) (steps 1J, 1K and steps 3J, 3K of FIGS. 5 and 7, respectively), has the following effects:

(a) CB(i) has changed into a "0" (see steps 1L of FIG. 5 and 3L of FIG. 7) and the modified message is retransmitted (steps 1M of FIG. 5 and 3M of FIG. 7);

(b) The Channel Access port is switched opposite the direction where this CB = "1" is received from (steps 2A–2E of FIG. 6 and steps 4A–4E of FIG. 8).

A received CB(i)="0" is not modified and has no switching action.

It should be noted that the above-described protection message processing and channel switching control is based on both protection messages.

Referring back to FIG. 9, the above-described configuration of the invention results in a ring-like configuration with one line, A, running clockwise (CW), and the other, B, running counterclockwise (CCW). Both lines have equal transmission capacity (equal number of channels). Direction 1 (DIR 1) port of a node is the one which receives from A and transmits to B and Direction 1 (DIR 2) port is the one which receives from B and transmits to A (see FIG. 10).

In practice, a channel's direction of connection should be configured to minimize the number of nodes between the channel's nodes of access. For example, in FIG. 9, channel 3 at FN #2 communicates with Channel 3 at CN using CN's DIR 2 port, thus having only one node (FN #1) on the way. Channel 4 at node FN #4 communicates to Channel 4 at the CN using CN's DIR 1 port, having only one node (FN #5) on the way.

The set-up connection (in case of any one channel there are only two possible directions of connection for these channels) is established by the network's operator, is stored in non-volatile memory at the nodes involved and can be changed whenever necessary.

The transmission rate may be at a multiple of either the North American or European standard hierarchies. This allows the use of: (a) the many specially designed ICs and channel cards supporting these standards, and (b) the available test equipment for line and channel testing.

The fundamental novel feature of the present invention is the protection method and mechanism used in case of a break or failure in the system. In most known systems, a complete switching of the aggregate links between nodes is performed in order to replace a failed connection with a back-up connection. In the novel system according to the present invention, no new connection is formed at the aggregate level, but the channel interfaces change direction of connection as necessary to recover the full operation of the system.

Figure 10:
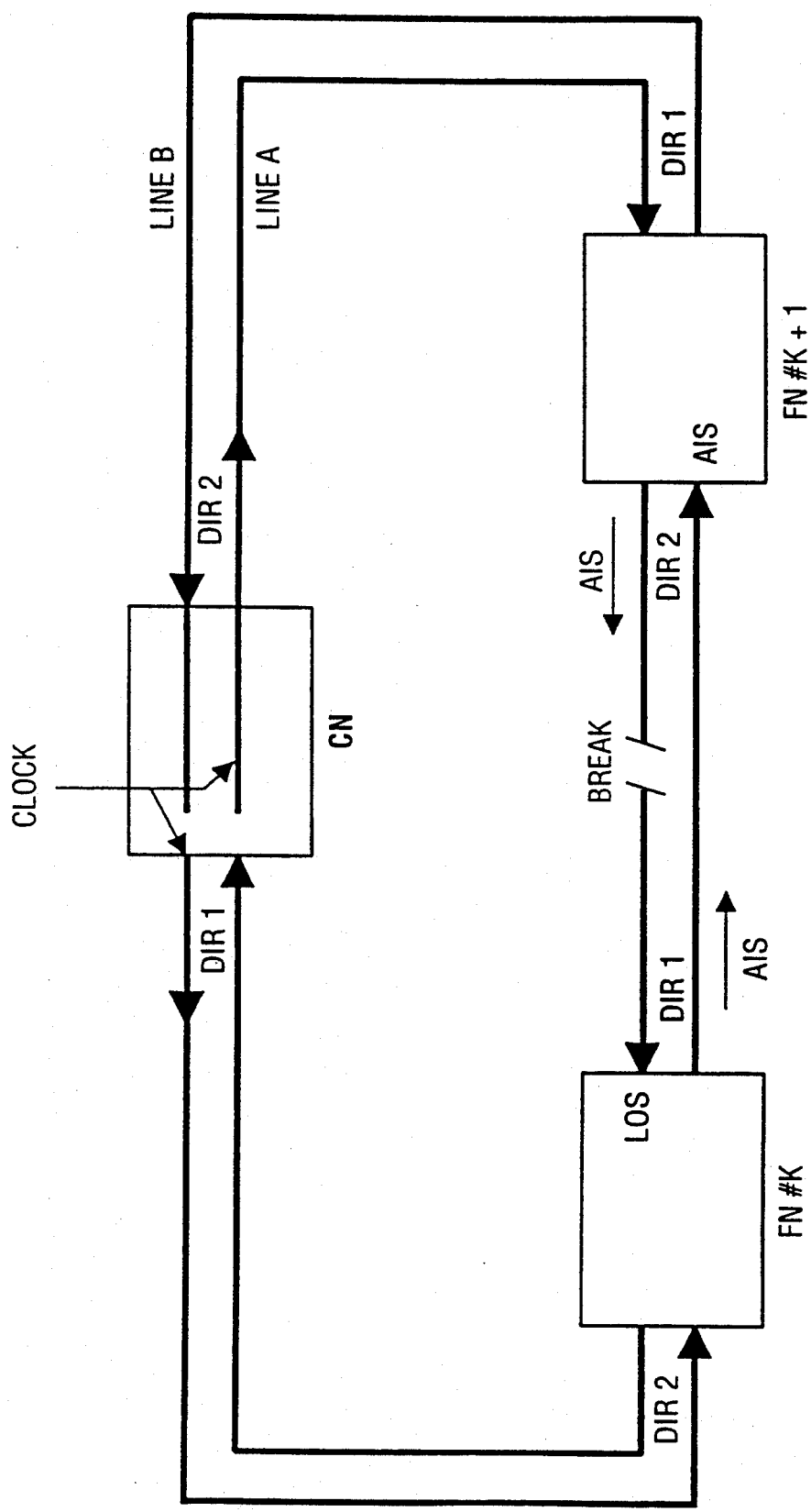
FIG. 10 is a diagram showing in some detail a ring with failure in accordance with the present invention.

FIG. 10 shows a ring with a one-line break and is used to discuss the different types of system failures that can occur and for which the novel protection mechanism would apply, namely:

A. CABLE BREAK, BOTH LINES

In such a case, a Loss of Signal (LOS) alarm signal is generated at the receivers of adjacent nodes FN #k and FN #k+1. An alarm signal on the A ring receiver is generated at node FN #k and an alarm signal an the B ring is generated at node FN #k+1. As a consequence Alarm Indication Signals, AIS (e.g. all "1"s) are sent in the opposite directions. The break is detected by the loss of the signal or by a highly-distorted signal (high error rate). This applies to the AIS signal, too. The AIS itself is needed only in order to take care of the case of one-line failure, as described at B. CABLE BREAK, ONE LINE below.

The FNs at the ends of the failed cable section, i.e. FN #k and FN #k+1 (see FIG. 10), start operation as end stations of a Drop/Insert linear system with their clock still originating at the CN. Following the break, the CN detects FNM on both lines and, as a result, it becomes a Drop/Insert node. When the failure is removed, the system will automatically return to the original (normal) configuration stored in the non-volatile memory of every node.

B. CABLE BREAK, ONE LINE

This is equivalent to the two lines break since after node #k detects a failure on one line (A), the AIS signal sent in the opposite direction (on B) also generates a failure signal when received at the other end (node #k+1).

C. NODE FAILURE

A node failure occurs when there is a failure of the common equipment of the node that disables the communication with one or both sides of the node. It is, therefore, treated as equivalent to cable failures at one or both sides of the failed node. The detection of the node failure is performed at the adjacent nodes. The failure of an aggregate interface in a node is equivalent to a break of the corresponding side cable. The power failure at the node is a complete node failure.

D. PARTY LINE

Figure 11:
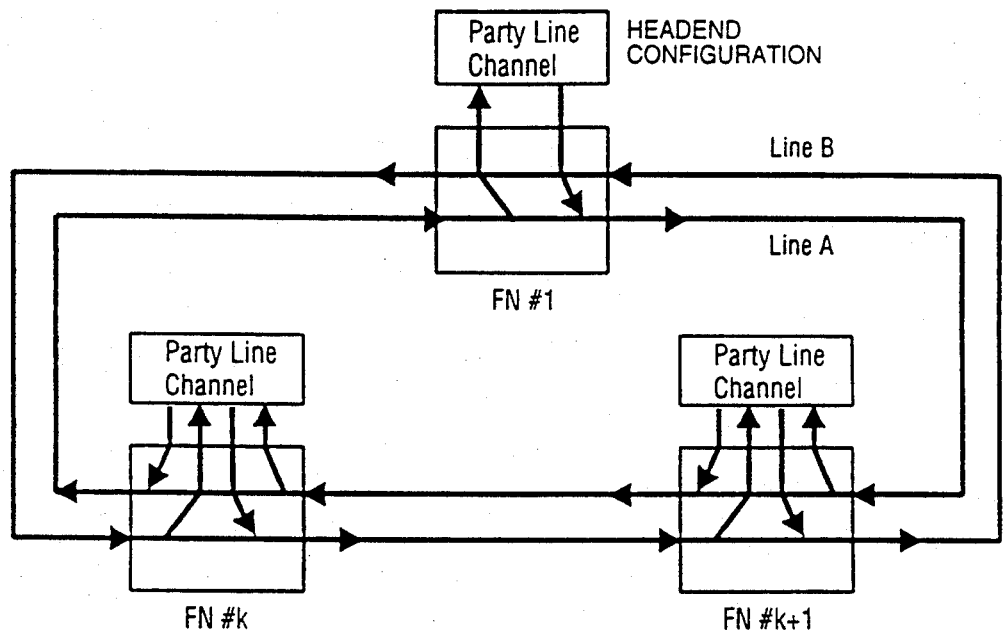
FIG. 11 is a diagram showing a party line according to the invention with normal connection.
Figure 12:
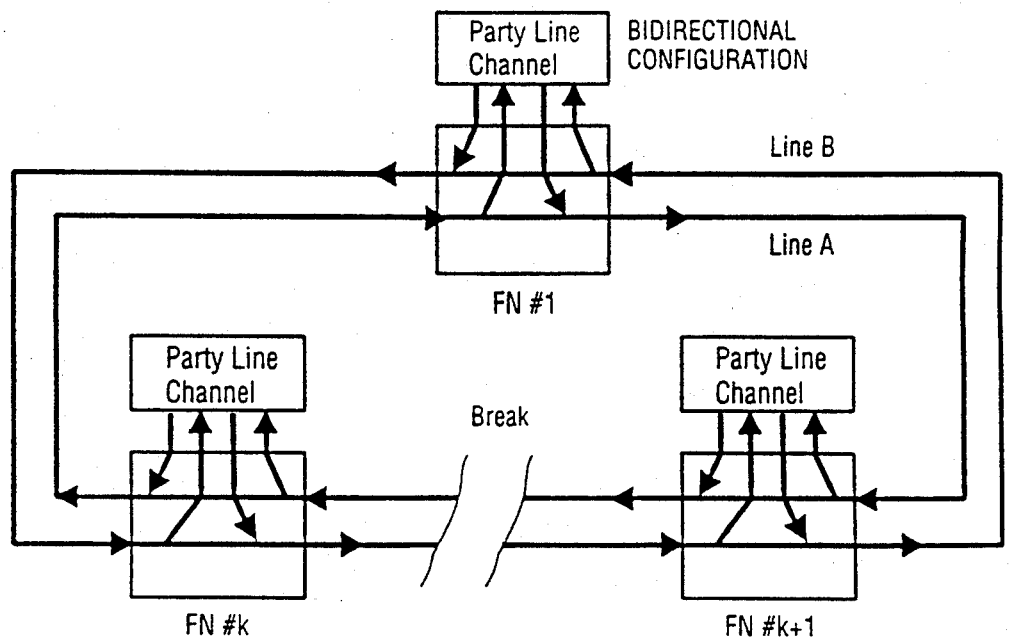
FIG. 12 is a diagram showing the same party line as in FIG. 11, but after failure.

FIGS. 11 and 12 illustrate the Partyline protection. FIG. 11 shows the normal connection of a Partyline channel at FN #1, which usually is the CN. It is connected in one direction only for reception and transmission (Headend Configuration). The Partyline channel at all the other Field Nodes FN #k, FN #k+1 is connected in both directions (Omni-directional).

At any node except the headend, the voice received by any listener is the sum of the voice signals coming on the B and A rings. The Partyline channel sends on each ring the sum of the voice signals received from this ring and of those produced locally.

The situation after failure is illustrated in FIG. 12, where at FN #1 the channel connects Omni-directionally. The connections at all other FNs do not change. When the failure is removed, the Headend connections revert to the pre-configured ones, as shown in FIG. 11.

E. POINT TO POINT

Figure 13:
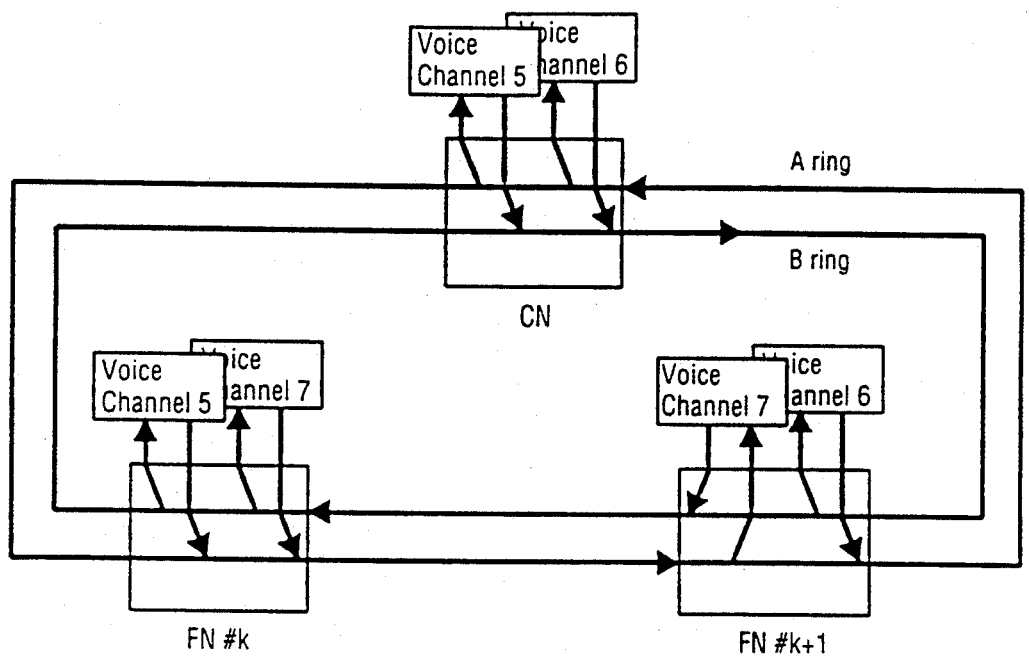
FIG. 13 is a diagram of a point to point system with usual connection in accordance to the present invention.
Figure 14:
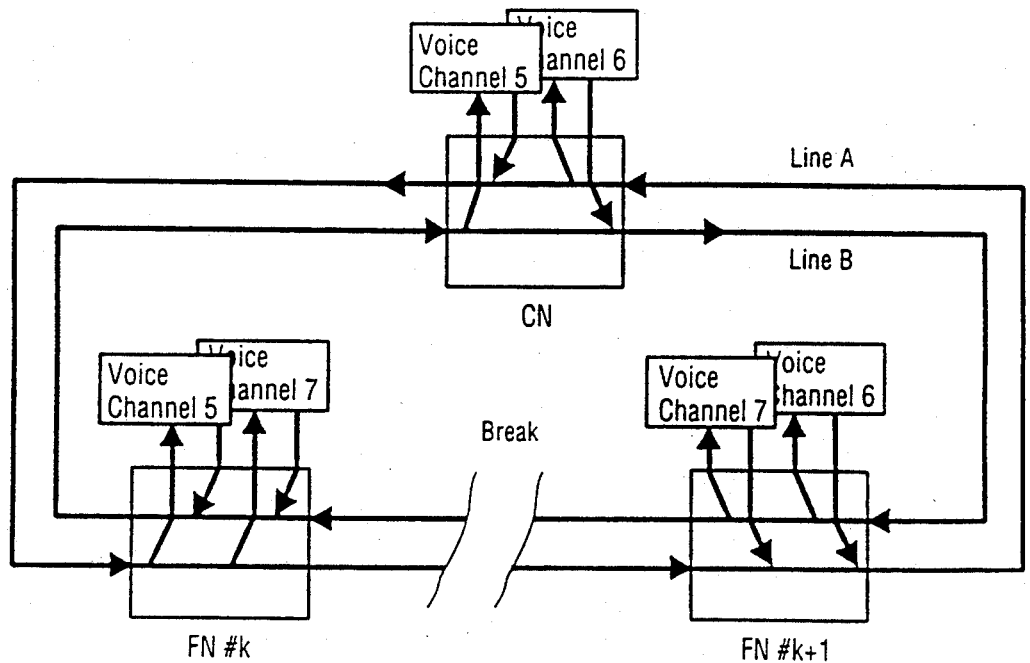
FIG. 14 is a diagram showing the same point to point system as in FIG. 13, after failure.

FIGS. 13 and 14 illustrate point to point protection. The normal connections are shown in FIG. 13. In the case of CN to FN connections, since the CN to FN channel connections are usually made on the shortest route, the CN connections are shown to be in DIR 2 only, which presupposes that the DIR 1 connection is longer.

In the case of FN to FN connection, the channel at one FN, for example FN #k, Ch. 7, is connected in DIR 2 and at the other FN, for example FN #k+1, Ch. 7, is connected in DIR 1. The channel does not pass through the CN.

The situation after failure is shown in FIG. 14. Here, following the general rule, all the channels in FNs switch directions away from the failure point and, in this case, towards the CN. For CN to FN connection, the channels on FN #k switch direction from DIR 2 to DIR 1 and the CN channel counterparts to the FN #k channels that switched to DIR 2, switch to DIR 1. For FN to FN connection, the channels that previously connected an FN from one side of the failed connection to an FN on the other side (Ch. 7 in FIG. 14), now pass through the CN. In the example of FIG. 14 the channels in FN #k switch to DIR 1 and those in FN #k+1 switch to DIR 2. There is no direction change for the FN to FN channels not affected by the failure.

F. MULTIDROP

A multi-drop data communication is defined between a computer named Host and multiple Terminals. The Host manages the communication so that only one Terminal can answer a query from the Host. The communication structure built in the system includes a Master data port connected to the Host in one node and Slave ports connected to Terminals in different other nodes. A multi-drop communication uses a timeslot of the TDM common to all its ports. The following describes the particulars of the protection switching mechanism for this connection.

In the normal situation, a Master installed at an FN transmits and receives data from both directions. When installed at a CN, it is connected only in one direction (e.g., DIR 2). Slaves are always connected one way, i.e., toward the Master.

In case of a break, a Master at the CN becomes bidirectional, while one an FN stays this way. Based on the received CBs, the Slaves switch direction away from the failure, therefore restoring the connection to the Master. The processing of the CBs (changing a CB="1" into a "0") takes place only at the Master, not at the Slaves.

DESCRIPTION OF OPERATION OF A SPECIFIC IMPLEMENTATION

The following describes operation of a specific implementation of this invention.

Failure Signal Mechanism

The protection mechanism, as discussed with reference to the above Figures, is based on the generation and transmission of data streams of Channel Bits (CB) and on the generation and transmission of the Central Node Mark (CNM) and Field Node Mark (FNM) messages.

A. CBs GENERATION AT THE CN

In ring's normal situation the CB messages are generated at the CN where the rings start. In normal situation all the CB(i) are "1" except for the channels accessed at the CN.

B. CNM, FNM GENERATION

In addition to the CBs, the CN sets Central Node Mark (CNM) messages on each ring: CNMB on B, CNMA on A. The CNMs are only sent by the CN. They are used to signal to the other nodes the existence of the CN and to help configuring a system or parts of it when a CN is not set-up or is disconnected. When no CN is defined, an FN sends Field Node Mark (FNM) messages: FNMB on B and FNMA on A. To ensure a fast reaction to the CNM, FNM, these signals are repeated frequently.

C. CB TRANSMISSION

The CBs are transmitted from the CN as serial streams on both lines A and B on special CB channels (CBC).

D. CBs GENERATION FOR AGGREGATE FAILURE

Whenever an FN detects a complete failure of the data stream reaching it or any other failure that leads this FN to become an End of line Node, it becomes the generator of CBs which are all set active "1". After processing in the node, the CBs are sent on the ring on which the failure was sensed so that the CB message generation is on a per ring base.

E. CB PROCESSING

The CB processing is explained with reference to FIG. 15 where a 24-channel system is represented and the Channel (Ch) numbers represent the channels accessed at each node.

At every node and on each ring, the messages are received, processed together with the node's channel configuration information and the resulting CBs are sent further on the ring to the next node.

Figure 15:
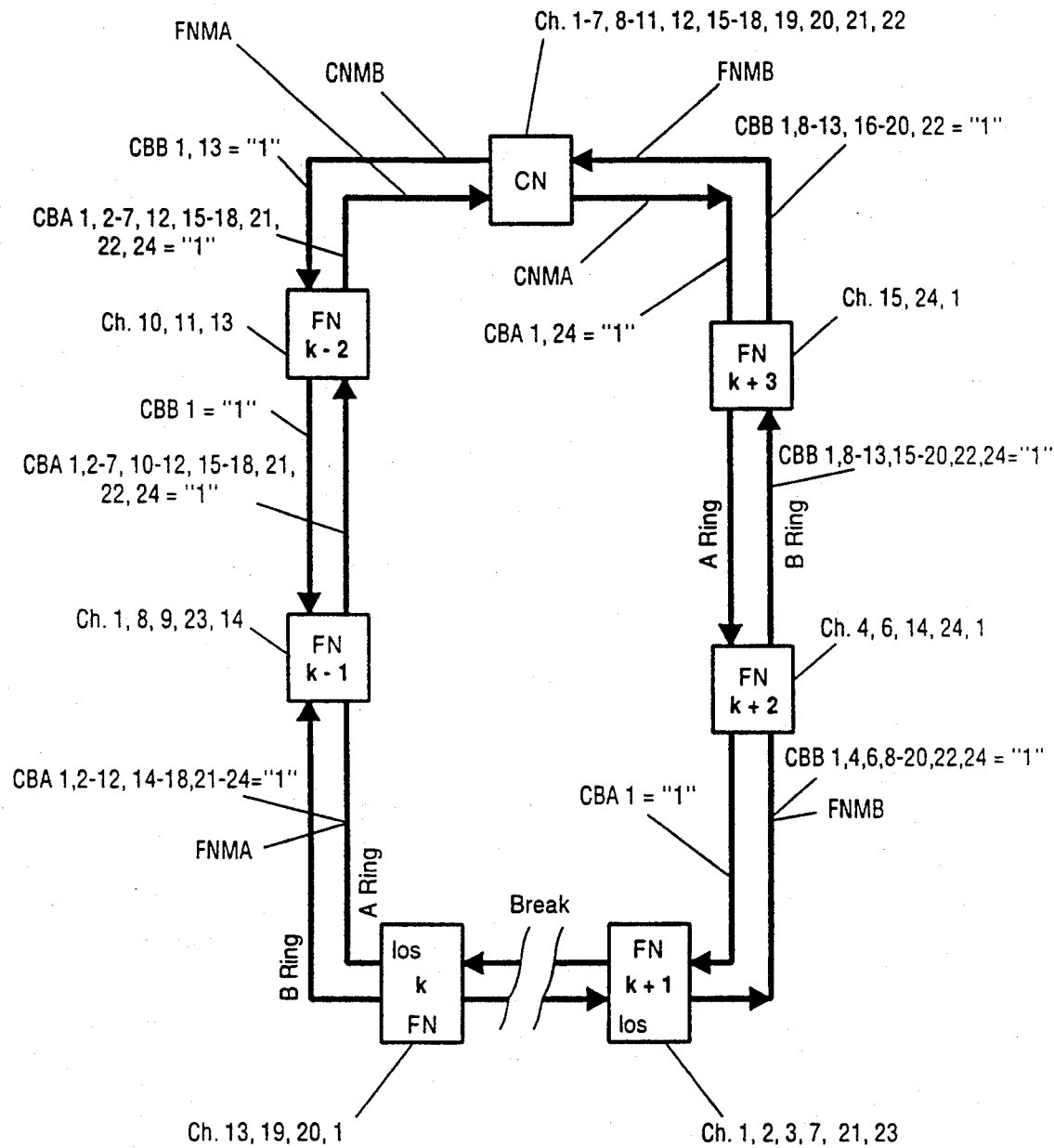
FIG. 15 is a diagram showing the principle of ring failure signalling operation after failure.

When a cable break or a node failure occurs, the failure is detected at the nodes adjacent to this failure (example nodes #k and #k+1 in FIG. 15). Each node adjacent to the failure switches its point to point and multipoint slave channel cards away from the failure, according to the protection rules of the present invention. At the start point (the node adjacent to failure) all the CBs are set active ("1"). The CBs belonging to channels installed (accessed) at this node are reset ("0"), so that at the output of the start node only the CBs for the not installed channels have the value "1". For all the channels that have CB(i)=1, the channel content is set to IDLE.

At an FN non-adjacent to a failure, the received CBs are passed through unchanged except for those whose channels are accessed at that node. These CBs are reset (changed into "0"), and the respective channels are switched away from the failure if they are not already directed that way. The status of the accessed channel is changed from IDLE into the actual channel content. The resulting CB string is retransmitted to the following node and the process repeated. The process takes place on both A and B lines.

If, for some reason, the processing of the CBs at one node is not possible, the CB message is passed to the following node, unchanged.

The protection processing at the CN is carried out as follows:

1. In the normal case:
   The CN receives CNMN on both rings (CNMA and CNMB);
   The CN sends CB messages on both rings;
   The CN sends CNMs on both rings; and
   The received CB messages are not passed through the CN.

2. In Case of aggregate failure on the ring:
   On not receiving CNM, the CN passes through the received CBs unchanged, except for those whose channels are accessed at that node.
   The CN always inserts the outgoing CNMs.

Referring again to FIG. 15, at nodes #k−1, #k+2, the CBs are received and the node switches the direction of accessed channel cards whose received CB is "1", according to the protection rule of the invention, namely:
   away from the failure;
   no switching of the channels whose received CB(i)=0.

The transmitted CBs belonging to the channels accessed at nodes #k−1, #K+2, are turned to "0". The CBs of the channels not accessed at nodes #k−1, #k, #k+1, #k+2, retain the value "1" and their corresponding channels keep their IDLE content.

At the succeeding nodes (#k−2, #k+3) the process is repeated so that at the output of these node only the CBs belonging to channels that were not accessed at the preceding nodes #k−2, #k−1, #k (on line A) and #k+1, #k+2, #k+3 (on line B) retain the value "1".

At the central node (CN), in case of failure, the CBs operate in the same manner as for the other nodes.

The above described processing applies in both directions from the failure: from node #k on line A, from node #k+1 on line B.

F. CN CONFIGURATION

The CN is always configured as the clock and frame source of both rings.

The CN channels are initialized as configured, transmitting and receiving either in DIR 1 or DIR 2 or in both directions.

The channels not accessed at CN should be all IDLE.

The CN could pass through any channels, voice or data, that don't terminate at the CN and don't need to be self-healing. The DIR 1 sends the DIR 2 received channels multiplexed with the Inserts of the CN. The DIR 2 transmits the DIR 1 received channels multiplexed with the channels inserted at the CN.

The CN is the origin of the CB messages and of the CNM messages.

It stays this way as long as it receives the correct CNMs on both rings.

If the CNM is not received it means that the source of the CB message is not the CN anymore. It becomes a D/I station for the CB message.

G. FN CONFIGURATION

An isolated FN is configured as transmitting on both rings IDLE channels synchronized to the internal clock. The node transmits on both rings CBs as in the case of total failure (all "1"s except for the channels accessed at the FN). The node transmits FNMs on both rings.

As soon as the FN is connected to the system and the reception is valid on both rings, the clock source becomes the clock recovered from the received data. If only one side reception is valid, the clock is looped back from the valid recovered one to the other direction transmission, as long as CNM is received. If the FNM is received, the loop-back of the clock is done only between line A clock and line B clock. In the opposite direction the loop-back is not performed and the local clock (on ring A) stays active.

The CBs values change to those of either the normal situation if the system is complete, or to those defined by other nodes preceding this node on the ring in both directions.

It should be noted that the above preferred embodiments have been provided by way of example and that numerous modifications and variations may be made by those skilled in the art without departing from the spirit of the invention and the scope of the following claims.

We claim:

1. A self-healing drop and insert communication network comprising two end stations and a chain of drop and insert multiplexer stations, said two end stations being connected by two lines to said chain of intermediate drop and insert multiplexer stations so as to provide communication in both directions, east and west, for multiple data or voice channels between any of the stations, characterized in that, in the event of a break or failure in the communication network, said two end stations are interconnected to form one drop and insert multiplexer station, whereas the stations on each side of the break or failure become new end stations, and means are provided for redirecting communication transmitted by said data or voice channels away from the point of break or failure when it occurs, wherein the means for redirecting communication transmitted by the channels away from the point of break or failure comprise channel access circuits which can be oriented east or west by electrical control and which are configured to automatically change direction as required in case of break or failure in the network, wherein the means for redirecting communication transmitted by the channels are provided for redirecting individual channels in case of break or failure, thereby allowing the network to self-heal and remain operational after the occurrence of the break or failure.

2. A network according to claim 1, wherein the change of direction in the event of break or failure is done using channel cards and wherein the direction of connection of each card is software controlled.

3. A network according to claim 1, further comprising channels which are not self-healing and which are configured not to switch direction in case of break or failure in the network, whereby these channels will fail in the event of such a break or failure.

4. A self-healing method for a drop and insert communication network comprising two end stations and a chain of drop and insert multiplexer stations, said two end stations being connected by two lines to said chain of intermediate drop and insert multiplexer stations so as to provide communication in both directions, east and west, for multiple data or voice channels between any of the stations, which method comprises interconnecting said end stations with one another in the event of break or failure in the network so as to form one drop and insert multiplexer station and redirecting communication transmitted by said data or voice channels away from the break or failure, when it occurs, thereby allowing the network to self-heal and remain operational after the occurrence of the break or failure, wherein said redirecting communication is achieved by a change of configuration controlled by a configuration status signal sent away from the stations adjacent to the point of failure on both lines and received by all other stations, wherein said configuration status signal is used to individually redirect communication transmitted by the channels away from the break or failure.

5. A self-healing method for a drop and insert communication network comprising two end stations and a chain of drop and insert multiplexer stations, said two end stations being connected by two lines to said chain of intermediate drop and insert multiplexer stations so as to provide communication in both directions, east and west, for multiple data or voice channels between any of the stations, which method comprises interconnecting said end stations with one another in the event of break or failure in the network so as to form one drop and insert multiplexer station and redirecting communication transmitted by said data or voice channels away from the break or failure, when it occurs, thereby allowing the network to self-heal and remain operational after the occurrence of the break or failure, wherein said redirecting communication is achieved by a change of configuration controlled by a configuration status signal sent away from the stations adjacent to the point of failure on both lines and received by all other stations, wherein said configuration status signal is used to redirect preselected channel connections away from the break in order to restore communications.

6. The self-healing method for a drop and insert communication network of claim 5 wherein said configuration status signal is software controlled.

7. A self-healing method for a drop and insert communication network comprising two end stations and a chain of drop and insert multiplexer stations, said two end stations being connected by two lines to said chain of intermediate drop and insert multiplexer stations so as to provide communication in both directions, east and west, for multiple data or voice channels between any of the stations, which method comprises interconnecting said end stations with one another in the event of break or failure in the network so as to form one drop and insert multiplexer station and redirecting communication transmitted by said channels away from the break or failure, when it occurs, thereby allowing the network to self-heal and remain operational after the occurrence of the break or failure, wherein said redirecting communication is achieved by a change of configuration controlled by a configuration status signal sent away from the stations adjacent to the point of failure on both lines and received by all other stations, wherein selected channels are preselected as not to be redirected, wherein the said preselected channels are used to increase the capacity of said network after said occurrence of said break or failure.

* * * * *